(12) United States Patent
Bauer et al.

(10) Patent No.: US 6,662,057 B1
(45) Date of Patent: Dec. 9, 2003

(54) METHOD AND DEVICE FOR CONTROLLING PROCESSES IN A COMPUTER SYSTEM

(75) Inventors: Stefan Bauer, Türkenfeld (DE); Ulrich Haas, Fürstenfeldbruck (DE); Egon Niessner, Mering (DE); Birgit Simsch, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/582,547

(22) PCT Filed: Nov. 4, 1998

(86) PCT No.: PCT/DE98/03215

§ 371 (c)(1),
(2), (4) Date: Jun. 28, 2000

(87) PCT Pub. No.: WO99/38072

PCT Pub. Date: Jul. 29, 1999

(30) Foreign Application Priority Data

Jan. 22, 1998 (DE) .......................................... 198 02 364

(51) Int. Cl.$^7$ .............................................. G05B 19/18
(52) U.S. Cl. ...................... 700/2; 700/5; 700/3; 700/4; 700/19; 709/103; 709/104; 709/105; 709/200; 709/225; 370/229; 370/231; 370/232; 370/236; 370/400
(58) Field of Search ................................ 700/2, 3, 4, 5, 700/9, 19, 20, 32; 709/101–103, 104, 105, 200, 235, 223–226, 216–218, 229, 239, 243, 316; 370/231–236, 229, 400, 402

(56) References Cited

U.S. PATENT DOCUMENTS

| | | | | |
|---|---|---|---|---|
| 5,522,070 A | * | 5/1996 | Sumimoto | 709/104 |
| 5,991,808 A | * | 11/1999 | Broder et al. | 709/104 |
| 6,067,545 A | * | 5/2000 | Wolff | 370/238 |
| 6,125,397 A | * | 9/2000 | Yoshimura et al. | 370/229 |
| 6,128,279 A | * | 10/2000 | O'Neil et al. | 370/229 |
| 6,256,726 B1 | * | 7/2001 | Hotta et al. | 712/213 |
| 6,275,867 B1 | * | 8/2001 | Bendert et al. | 709/316 |
| 6,363,453 B1 | * | 3/2002 | Esposito et al. | 711/2 |
| 6,389,446 B1 | * | 5/2002 | Torii | 709/100 |

* cited by examiner

*Primary Examiner*—Ramesh Patel
(74) *Attorney, Agent, or Firm*—Bell Boyd & Lloyd LLC

(57) ABSTRACT

A computer system and method for executing several processes in tandem, that includes a scarce resource, which is accessed by the processes to be executed. A first device is provided for computing the capacity load of the scarce resource, a second device is provided for determining a load responsibility of a process that accesses the scarce resource, and a third device is provided for delaying the execution of a process that accesses the scarce resource depending on each of the capacity load, the critical capacity load of the scarce resource, and the load responsibility of the process. In this way, a blocking of the scarce resource with a limited capacity, and thus of the computer system, can be prevented.

20 Claims, 1 Drawing Sheet

Delay D

1
METHOD AND DEVICE FOR CONTROLLING PROCESSES IN A COMPUTER SYSTEM

BACKGROUND OF THE INVENTION

The present invention relates both to a computer system and a method for controlling processes on such computer system which is configured particularly for the parallel execution of several processes using a scarce resource.

In a computer system as described the problem frequently arises above that a blocking of a scarce resource occurs when the several processes that access the resource exhaust its capacity. Such blockings lead to an unstable system state which, in turn can necessitate frequent undesirable restarting measures.

To solve this problem, it is possible to expand the scarce resource. But the same problem then occurs with another resource of the computer system, which is then scarce. Another known solution is to delay all processes accessing the resource in a constant manner. However, this leads to a delay of process execution and can prevent a blocking of the scarce resource only up to a certain elevated maximum load.

In addition, European patent EP-A-0-794 490 teaches a multitasking system, or the communication in a computer network in accordance with a client/server model, in which several clients can access one server. There, the access to the server is controlled via the number of threads specified by the client. When a certain number is exceeded, either a connection is not set up, or the client must wait until a thread is permitted.

It is therefore an object of the present invention to configure this type of computer system, and a method for controlling processes on the computer system, by which it is possible to prevent a blocking of the scarce resource.

SUMMARY OF THE INVENTION

This object is inventively achieved by a computer system, and method for controlling the same, having a first device for computing the capacity load C of the resource, a second device for determining a load responsibility of a process that accesses the resource, and a third device for delaying the execution of the process that accesses the resource depending on each of the capacity load C, the critical capacity load $C_{crit}$ of the resource, and the load responsibility LR of the process.

The inventive device and the inventive method function adaptively; that is, depending on the current usage level of the resource and on the load responsibility of a process, so that other processes that only slightly load the resource can continue to run unaffected. It can, thus, be guaranteed that processes that are necessary for the stability of the system continue to run despite heavy loading of the resource. On the basis of the specific delaying of each individual process dependent on each of the current capacity load, the critical capacity load and the load responsibility of the respective process, the user of the computer system can implement desirable marginal conditions. For example, individual processes with higher priority can be delayed only shortly or not at all, despite an overcritical load. The delay of a process can increase with the respective load responsibility of the process. Processes whose load responsibility is below a limit value can remain completely unaffected by the delay. When the load of the scarce resource lies below a critical load, all processes can be executed without delay.

The load responsibility LR can be defined either as the number of accesses of the scarce resource that are required in the execution of a process, as the resource capacity demanded by the process, or as a combination of both.

The critical capacity load $C_{crit}$ of the resource can be selected according to the type, task, and stability of the resource. The critical capacity load $C_{crit}$ advantageously lies between 20% and 80% of the maximum capacity $C_{max}$; in particular, at approximately 50% of the maximum capacity.

A process whose load responsibility LR lies below a defined value advantageously is not delayed. In this way, processes that make little or no contribution to the critical load can continue to run without a delay.

When the actual instantaneous capacity load C of the resource lies below the critical capacity load $C_{crit}$, all processes are executed without delay. The computer system can thus function at maximum speed when a critical load is not present.

The delay can be varied between a minimum and maximum delay time, wherein it is possible to select the minimum and maximum values according to the characteristics and requirements placed on the resource.

Additional features and advantages of the present invention are described in, and will be apparent from, the following Detailed Description of the Invention and the Figures.

DETAILED DESCRIPTION OF THE INVENTION

Essential terms that are needed to describe the present invention are defined as follows:

Computer System:

Computer system refers to any device for electronic data processing, regardless of whether it is a matter of a multipurpose computer for executing application programs or a computer that is tailored to one task. In particular, computer systems for control and communication networks also are included here.

Resource:

Resource or operating device refers to components (hardware and software) of the computer system that can be used to perform a job—for instance, an information transmission—such as storage devices, interfaces, and data lines.

Process:

A process is a set of instructions that access a resource of the computer system.

Figure 1:
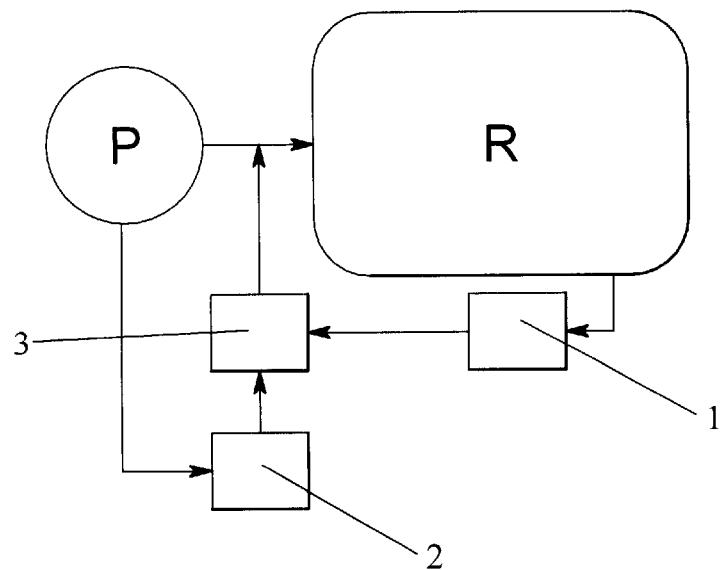
FIG. 1 shows a block diagram schematic of a computer system in accordance with the teachings of the present invention.

When several processes P run in parallel in the computer system of the present invention, a heavy loading can occur due to accessing of a scarce resource R of the computer system. Referring to FIG. 1, a first device 1 measures the capacity load C of this resource R, potentially a storage unit, in which case the occupancy of the storage capacity can be used as a measure of the load. A second device 2 determines a load responsibility LR for each process (referenced P in FIG. 1) that accesses the scarce resource R, which load responsibility is a measure of the responsibility of the process for the capacity load C of the scarce resource R. A third device 3 then delays the execution of the process P that accesses the resource by a period depending on each of the current capacity load C, the critical capacity load $C_{crit}$, the resource R, and the load responsibility LR of the process. If a process has a small load responsibility, it is not delayed. The third device 3 generates a delay of processes only when the actual capacity load C is above the critical capacity load $C_{crit}$. Depending on the instantaneous capacity load and load responsibility of a process, it can be delayed by a period between a minimum delay $D_{min}$ and a maximum delay $D_{max}$.

Figure 2:
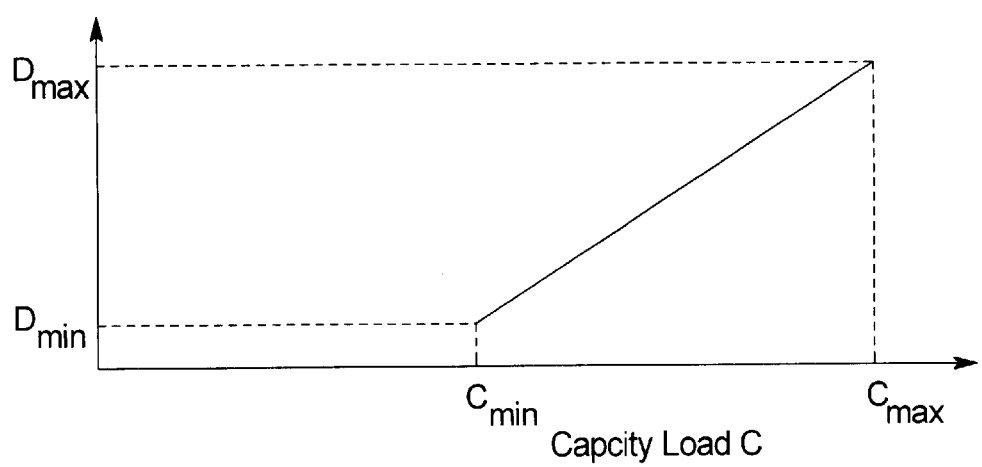
FIG. 2 is a graph diagram of Delay vs. Capacity Load which details the mode of functioning of the present invention.

FIG. 2 is a graph diagram of the delaying of a process P having a load responsibility LR=0 by the third device 3 depending on the current capacity C of the resource R. Below the critical capacity $C_{crit}$, the process is not delayed. When this critical capacity $C_{crit}$ is reached, a delay of $D_{min}$ sets in which increases as capacity load rises up to the maximum value $D_{max}$.

By delaying specific processes under load that access the scarce resources and contribute to the loading of the resource particularly heavily, the capacity bottlenecks can be eliminated, and a blocking of the resource and, thus, of the overall computer system can be avoided (like a speed limit on a highway for reducing the likelihood of a traffic jam). The stability of the system is thus improved, and individual processes that make no significant contribution to the capacity load of the computer system can continue to run with no significant delay.

A test example of the present invention is detailed below with reference to the attached FIGS. 1 and 2.

The delay of a process that accesses the scarce resource R (a memory having a capacity of 64 kbytes in the test case) was given by the formula:

$$D = \min\left(D_{max}, K \times LR + D_{min} + \frac{(C_{act} - C_{crit}) \times (D_{max} - D_{min})}{C_{max} - C_{crit}}\right)$$

where the maximum delay was $D_{max}$=15s; the minimum delay, $D_{min}$=0.5s; and the constant, K=0.1s.

The following values were selected:
$C_{crit}$=50% $C_{max}$, (here: $C_{crit}$=32 kByte)
$D_{min}$=0.5s
$D_{max}$=15s
K=0.1s.

The inventive computer system was tested under the given settings for several weeks. There were no blockings of the system owing to an overrun of the memory; that is, of the scarce resource R. In the enclosed computer printout, process refers to the name of a process that accesses the resource; time means the time at which the process occupies the resource; count means the load responsibility of a process when C is greater than $C_{crit}$ (in this case the number of write processes of the process); size means the capacity load (occupancy) C of the memory, where $C_{crit}$ equals 32 kBytes; and delay means the delay of the process that is brought about by the third device of the computer system.

If the capacity load rises above the critical capacity load, as it does at time 6:46:12.47, for example, a delay of a process sets in, which is greater the more heavily the process contributes to the loading of the scarce resource. When the capacity load falls below the critical limit again, as it does at time 06:47:23.21, the delay of the processes decreases exponentially over time.

An overrun of the memory, and thus a blocking of the computer system, did not occur during the entire system run.

Although the present invention has been described with reference to specific embodiments, those of skill in the art will recognize that changes may be made thereto without departing from the spirit and scope of the invention as set forth in the hereafter appended claims.

We claim:

1. A computer system for parallel execution of a plurality of processes using a scarce resource R which is to be accessed by the plurality of processes, the computer system comprising:
   a first device for calculating a capacity load C of the scarce resource R;
   a second device for determining a load responsibility LR of a process that accesses the scarce resource R; and
   a third device for delaying a process that accesses the scarce resource R depending on the capacity load C, a critical capacity load $C_{crit}$ of the scarce resource R, and the load responsibility LR of the process.

2. A computer system for parallel execution of a plurality of processes using a scarce resource R as claimed in claim 1, wherein the second device calculates the load responsibility LR depending on a number of accesses of the scarce resource R that are performed by a process.

3. A computer system for parallel execution of a plurality of processes using a scarce resource R as claimed in claim 1, wherein the second device determines the load responsibility LR of a process depending on a capacity of the scarce resource R that is demanded by the process.

4. A computer system for parallel execution of a plurality of processes using a scarce resource R as claimed in claim 1, wherein the second device raises the load responsibility LR of a process when the capacity load C is greater than the critical capacity load $C_{crit}$ and lowers the load responsibility LR when the capacity load C is less than the critical capacity load $C_{crit}$.

5. A computer system for parallel execution of a plurality of processes using a scarce resource R as claimed in claim 1, wherein the critical capacity load $C_{crit}$ is selected in the range between 20% and 80% of a maximum capacity $C_{crit}$ of the scarce resource R.

6. A computer system for parallel execution of a plurality of processes using a scarce resource R as claimed in claim 1, wherein the critical capacity load $C_{crit}$ is selected at 50% of the maximum capacity load $C_{crit}$ of the scarce resource R.

7. A computer system for parallel execution of a plurality of processes using a scarce resource R as claimed in claim 1, wherein the third device does not delay a process whose load responsibility LR is below a defined value.

8. A computer system for parallel execution of a plurality of processes using a scarce resource R as claimed in claim 1, wherein the third device does not delay processes when the capacity load C is less than the critical capacity load $C_{crit}$.

9. A computer system for parallel execution of a plurality of processes using a scarce resource R as claimed in claim 1, wherein the third device imposes a delay on a process, the delay being computed according to the formula:

$$D = \min\left(D_{max}, K \times LR + D_{min} + \frac{(C_{act} - C_{crit}) \times (D_{max} - D_{min})}{C_{max} - C_{crit}}\right)$$

where
   $D_{max}$ is a maximum delay, and $D_{min}$ is a minimum delay, and K is a selectable constant factor.

10. A computer system for parallel execution of a plurality of processes using a scarce resource R as claimed in claim 9, wherein the maximum delay is $D_{max}$=0.5s, and the constant is K=0.1s.

11. A method for controlling processes on a computer system for parallel execution of a plurality of processes using a scarce resource R which is to be accessed by the plurality of processes, the method comprising the steps of:

computing a capacity load C of the scarce resource R;

determining a load responsibility LR of a process that accesses the scarce resource R; and delaying the execution of the process that accesses the scarce resource R depending on the capacity load C, a critical capacity load $C_{crit}$ of the scarce resource R, and the load responsibility LR of the process.

12. A method for controlling processes on a computer system for parallel execution of a plurality of processes using a scarce resource R as claimed in claim 11, wherein the load responsibility LR of a process is determined depending on a number of accesses of the scarce resource R that are performed by the process.

13. A method for controlling processes on a computer system for parallel execution of a plurality of processes using a scarce resource R as claimed in claim 11, wherein the load responsibility LR of a process is determined depending on a capacity of the scarce resource R that is required for the execution of the process.

14. A method for controlling processes on a computer system for parallel execution of a plurality of processes using a scarce resource R as claimed in claim 11, the method further comprising the steps of:

increasing the load responsibility LR of a process when the capacity load C is greater than the critical capacity load $C_{crit}$; and decreasing the load responsibility LR of the process when the capacity load C is less than the critical load $C_{crit}$.

15. A method for controlling processes on a computer system for parallel execution of a plurality of processes using a scarce resource R as claimed in claim 11, the method further comprising the steps of:

selecting the critical capacity load $C_{crit}$ in a range between 20%; and 80% of a maximum capacity load $C_{max}$ of the scarce resource R.

16. A method for controlling processes on a computer system for parallel execution of a plurality of processes using a scarce resource R as claimed in claim 11, the method further comprising the step of:

selecting the critical capacity load $C_{crit}$ at 50% of a maximum capacity load $C_{max}$ of the scarce resource R.

17. A method for controlling processes on a computer system for parallel execution of a plurality of processes using a scare resource R as claimed in claim 11, wherein a process whose load responsibility LR is less than a defined value is not delayed.

18. A method for controlling processes on a computer system for parallel execution of a plurality of processes using a scarce resource R as claimed in claim 11, wherein processes that are not delayed when the capacity load C of the scarce resource R is less than the critical capacity load $C_{crit}$.

19. A method for controlling processes on a computer system for parallel execution of a plurality of processes using a scarce resource R as claimed in claim 11, the method further comprising the step of:

computering the delay according to the formula:

$$D = \min\left(D_{\max}, K \times LR + D_{\min} + \frac{(C_{act} - C_{crit}) \times (D_{\max} - D_{\min})}{C_{\max} - C_{crit}}\right)$$

where $D_{max}$ is a maximum delay, and $D_{min}$ is a minimum delay, and K is a selectable constant factor.

20. A method for controlling processes on a computer system for parallel execution of a plurality of processes using a scarce resource R as claimed in claim 19, wherein the maximum delay is $D_{max}$-15s, the minimum delay is $D_{min}$=0.5s, and the constant is K=0.1s.

* * * * *